(12) United States Patent
Jitaru

(10) Patent No.: US 6,414,578 B1
(45) Date of Patent: Jul. 2, 2002

(54) METHOD AND APPARATUS FOR TRANSMITTING A SIGNAL THROUGH A POWER MAGNETIC STRUCTURE

(75) Inventor: Ionel Jitaru, Tucson, AZ (US)

(73) Assignee: Ascom Energy Systems AG, Berne (CH)

( * ) Notice: Subject to any disclaimer, the term of this patent is extended or adjusted under 35 U.S.C. 154(b) by 0 days.

(21) Appl. No.: 09/740,314

(22) Filed: Dec. 18, 2000

(51) Int. Cl.[7] .................... H01F 27/28; H01F 17/06
(52) U.S. Cl. .................. 336/170; 336/212; 336/178
(58) Field of Search ........................ 336/178, 212, 336/170; 360/67

(56) References Cited

U.S. PATENT DOCUMENTS

| | | | | |
|---|---|---|---|---|
| 3,641,464 A | * | 2/1972 | Crowhurst et al. | 333/112 |
| 3,710,135 A | * | 1/1973 | Gilbert | 307/401 |
| 4,422,056 A | * | 12/1983 | Roberts | 333/177 |
| 4,994,952 A | * | 2/1991 | Silva et al. | 363/56 |
| 5,783,984 A | * | 7/1998 | Keuneke | 336/155 |

* cited by examiner

Primary Examiner—Anh T. Mai
(74) Attorney, Agent, or Firm—Birdwell, Janke & Durando, PLC

(57) ABSTRACT

A method and apparatus for transmitting a signal through a power magnetic structure. A power magnetic core has one or more windings for transmitting power, and two windings for transmitting a signal or auxiliary power. The signal or auxiliary power windings are looped around features of the core so as to cancel the effect of magnetic flux circulating in the core as a result of currents flowing through the one or more power windings.

6 Claims, 3 Drawing Sheets

METHOD AND APPARATUS FOR TRANSMITTING A SIGNAL THROUGH A POWER MAGNETIC STRUCTURE

BACKGROUND OF THE INVENTION

The present invention relates to a method and apparatus for transmitting a signal through a power magnetic structure, such as the power transformer in a DC-DC converter.

In power circuitry, it is often required to isolate control signals as well as to isolate the output power from the input power. The power transformer that is found in many power circuits accomplishes the latter objective. However, isolating the control signals has generally required an additional isolation device, such as an optocoupler or a signal transformer, adding undesirable expense and complexity to the power circuit.

Accordingly, there is a need for a method and apparatus for transmitting a signal through a power magnetic structure that provides for isolating control or other signals in power magnetic circuitry without the expense and complexity of employing an additional isolation device.

SUMMARY OF THE INVENTION

The method and apparatus for transmitting a signal through a power magnetic structure of the present invention solves the aforementioned problems and meets the aforementioned needs by providing a power magnetic core having one or more windings for transmitting power, and two windings for transmitting a signal or auxiliary power. The signal or auxiliary power windings are looped around features of the core so as to cancel the effect of magnetic flux circulating in the core as a result of currents flowing through the one or more power windings.

Preferably, the magnetic core has at least two apertures defining a center portion between the apertures and two leg portions. The core has primary and secondary windings as is typical in the art. Magnetic flux produced in the core by the primary for linking the secondary circulates through one of the leg portions in either the right hand or left hand sense, and circulates through the other leg portion in the opposite sense.

To transmit a signal, an input signal winding has a first portion looped around one of the leg portions so that an input signal current passed through the first winding will produce a magnetic flux in that leg portion that circulates in either the right hand or left hand sense. A second portion of the input signal winding is looped around the other leg portion in the opposite sense.

To provide an output, an output signal winding has a first portion looped around one of the leg portions in either. the right hand or left hand sense, and a second portion looped around the other leg portion in the opposite sense. A signal or power may be transmitted through power magnetic structure simultaneously with use of the magnetic structure as a component of a main power train.

Therefore, it is a principal object of the present invention to provide a novel method and apparatus for transmitting a signal through a power magnetic structure.

It is another object of the present invention to provide a method and apparatus for transmitting a signal through a power magnetic structure that provides for isolating the output of the signal from the input of the signal.

It is still another object of the present invention to provide such a method and apparatus for transmitting a signal through a power magnetic structure that provides for decreased cost.

It is yet another object of the present invention to provide such a method and apparatus for transmitting a signal through a power magnetic structure that provides for decreased circuit complexity.

The foregoing and other objects, features and advantages of the present invention will be more readily understood upon consideration of the following detailed description of the invention, taken in conjunction with the following drawings.

DETAILED DESCRIPTION OF A PREFERRED EMBODIMENT

Figure 1:
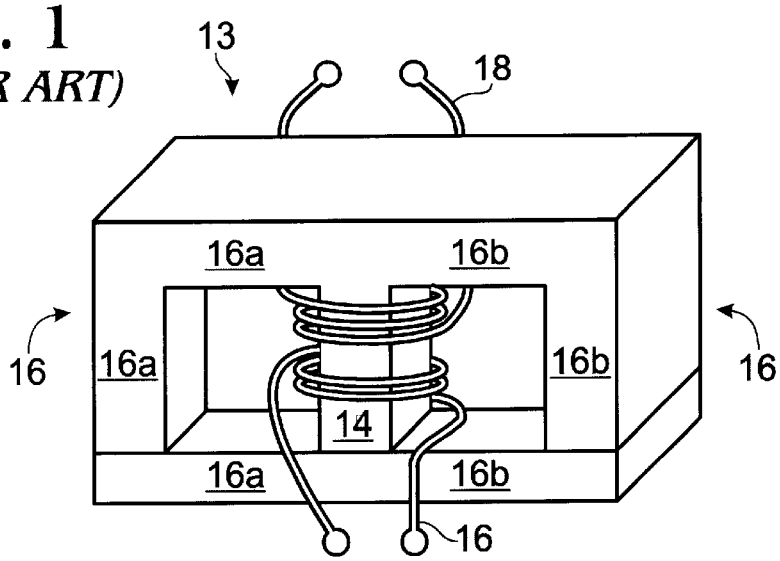
FIG. 1 is a pictorial view of a prior art power transformer.

Referring to FIG. 1, an apparatus 10 for transmitting a signal through a power magnetic structure according to the present invention. The power magnetic structure is typically a transformer having a core 13 comprising a center portion 14 and two leg portions 16a and 16b. The core 13 is formed of a material that is magnetically permeable relative to the air, such as ferrite.

To transmit power, a primary winding 18 is looped around the center portion 14 of the core, and a secondary winding 20 is also looped around the center portion of the core, or around either or both of the leg portions 16 as is standard practice in the art. A "loop" for purposes herein may encircle the center portion or leg portion once, more than once, or less than once. For example, for low output voltage applications, a loop may be encircle the center portion or leg portion by a fractional turn.

Figure 2:
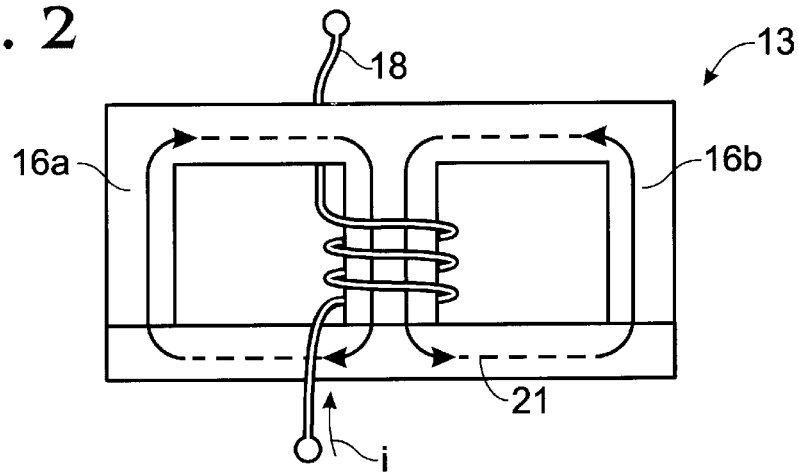
FIG. 2 is a pictorial schematic of the transformer of FIG. 1 showing the direction of magnetic lines of flux induced by current flowing through the primary of the transformer.

Referring to FIG. 2, a result of looping the primary winding around the center portion of the core 13 is that lines of magnetic flux 21 circulate through one of the leg portions 16a in either the right hand or left hand sense (either clockwise or counterclockwise as seen in FIG. 2 depending on the polarity of the current "i" flowing through the primary), and circulates through the other leg portion 16b in the opposite sense. For purposes herein, a right hand or left hand "sense" in connection with either a winding around or a flux path may be consistently defined as being in accordance with the well known right hand rule.

According to the invention, the core 13 may also be employed for transmitting a signal wherein it is desired to isolate the output of the signal from the input of the signal.

This provides the outstanding advantage of eliminating the expense and circuit complexity of providing a separate optocoupler, transformer or other isolation device.

Figure 3:
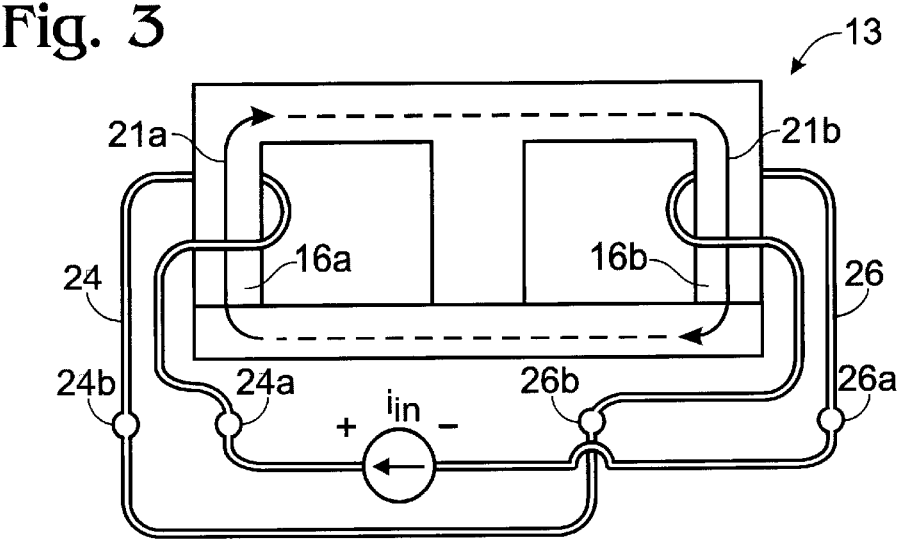
FIG. 3 is a pictorial schematic of the transformer of FIG. 1 showing two input signal windings according to the present invention.

For this purpose, two additional windings are provided. Referring to FIG. 3 illustrating two portions of an input signal winding, a first input signal winding portion 24 is looped around one of the leg portions 16a so that an input signal current "$i_{in}$" passed through the first winding portion 24 will produce a magnetic flux 21 a in the leg portion 16a that circulates in either the right or left hand sense, depending on the polarity of the input signal current. The input signal current passes through the first winding portion from a first terminal 24a of the winding portion to a second terminal 24b of the winding portion.

A second input signal winding portion 26 is looped around the other leg portion 16b and has a first terminal 26a and a second terminal 26b. The winding portion 26 is looped around the leg portion 16b and the terminals 26a, 26b are connected to the terminals 24a, 24b so that the input signal current "$i_{in}$" passed through the second winding portion 26 will produce a magnetic flux 21b in the leg portion 16b that circulates in the same sense as the magnetic flux produced by the first winding portion. The magnetic flux 21a is therefore the same as the magnetic flux 21b.

Figure 4:
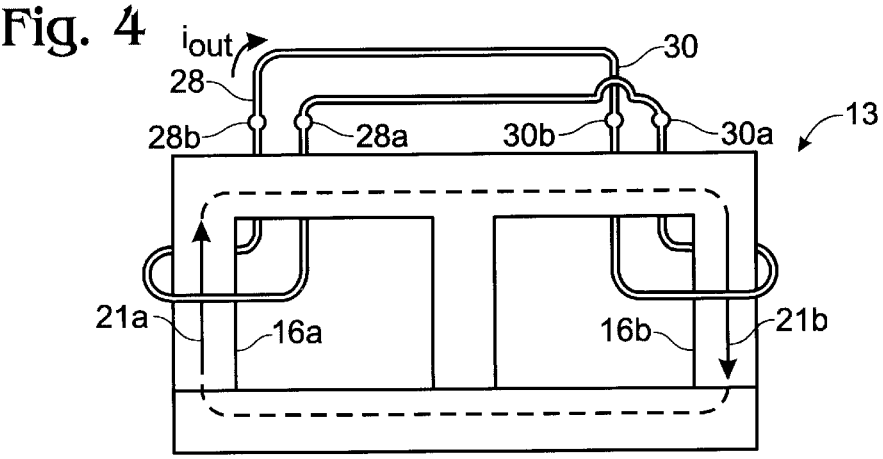
FIG. 4 is a pictorial schematic of the assembly of FIG. 3 showing the lines of flux of FIG. 2.

Turning to FIG. 4, according to the invention a pair of output signal winding portions 28, 30 are provided that are electrically isolated from the input winding portions 24, 26, The winding portions 28 and 30 are looped analogously to the winding portions 24 and 26. Thence, the first output signal winding portion 28 is looped around one of the leg portions so that an output current "$i_{out}$" will flow through the winding portion 28 as a result of the magnetic flux 21a in the leg portion 16a. The output signal current passes through the first output signal winding portion 28 from a first terminal 28a of the winding portion to a second terminal 28b of the winding portion.

A second output signal winding portion 30 is looped around the other leg portion 16b and has a first terminal 30a and a second terminal 30b. The winding portion 30 is looped around the leg portion 16b and the terminals 30a, 30b are connected to the terminals 28a, 28b so that the same output signal current "$i_{out}$" will flow through the second output signal winding portion 30 as a result of the magnetic flux 21b in the leg portion 16b.

Figure 5:
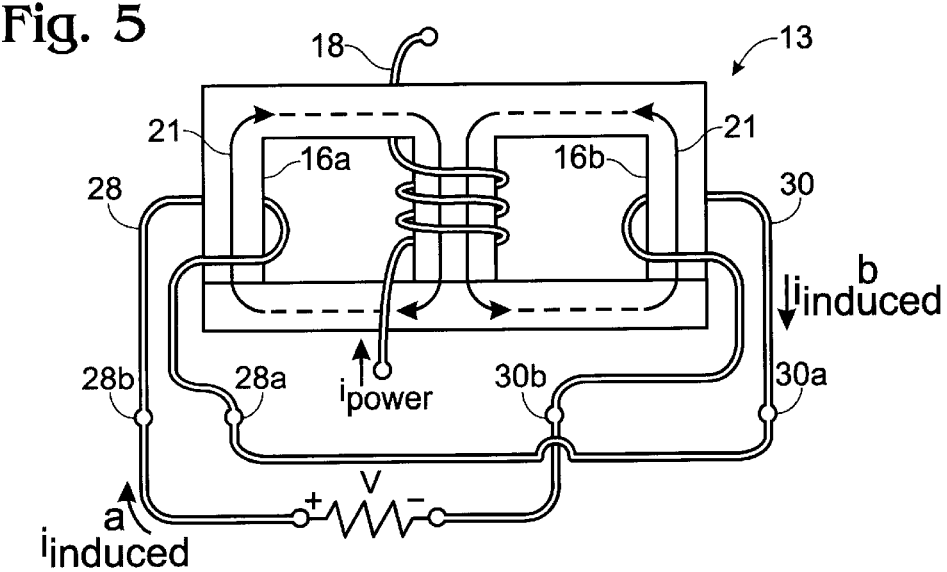
FIG. 5 is a pictorial schematic of the transformer of FIG. 1 or FIG. 3 showing two output signal windings according to the present invention.

Referring to FIG. 5, lines of magnetic flux 21 induced by power current "$i_{power}$" flowing through the primary winding 18 links the winding portions 28 and 30 inducing equal and opposite currents "$i^a_{induced}$" and "$i^b_{induced}$" therein, so that the voltage "V" across terminals 28b and 30b that is induced by power transmission will be zero. Accordingly, the output signal current is unaffected by the power input. Similarly, currents produced in the input winding portions 24 and 26 by flux linkage with the primary are also cancelled.

Figure 6:
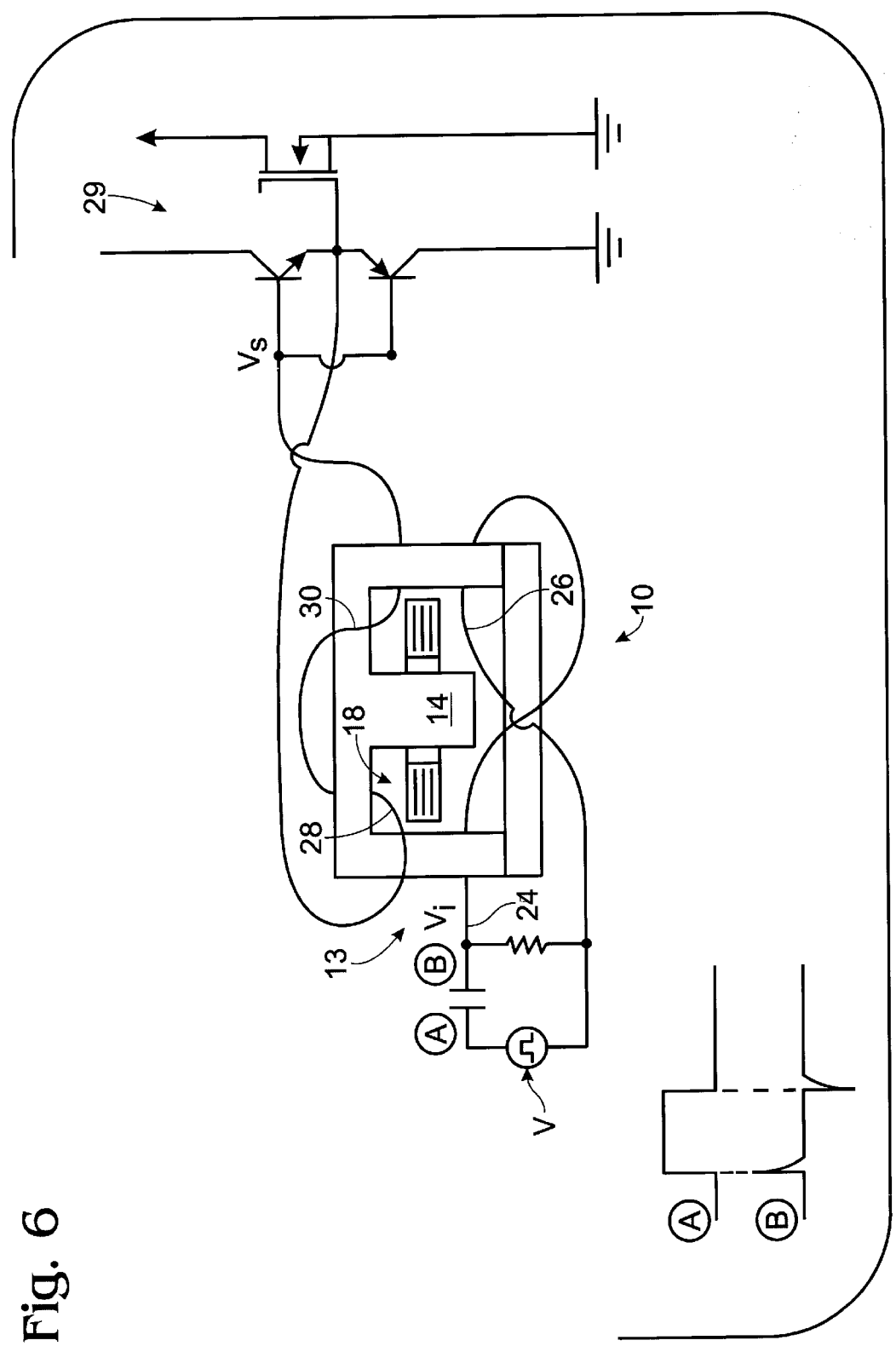
FIG. 6 is a pictorial schematic of an exemplary circuit employing a method and apparatus for transmitting a signal through a power magnetic structure according to the present invention.

Turning now to FIG. 6, an exemplary circuit employing the apparatus 10 as aforedescribed is shown. The circuit is part of a DC-DC converter wherein a switching signal $V_s$ is provided as input to a switching circuit 29. It is desired to isolate $V_s$ from the input control signal $V_i$, which in this example is derived by differentiating a square wave voltage source V. Shown are the primary winding 18, the input signal winding portions 24 and 26, and the output signal winding portions 28 and 30.

Figure 7:
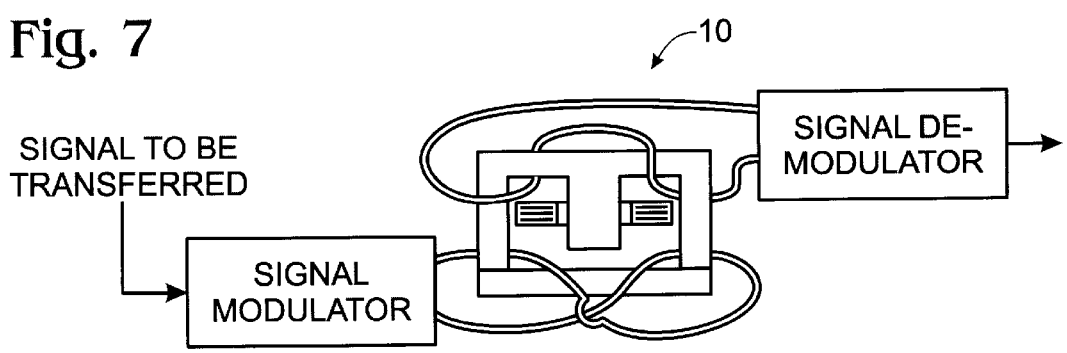
FIG. 7 is a pictorial block diagram of yet another exemplary circuit employing a method and apparatus for transmitting a signal through a power magnetic structure according to the present invention.

Referring to FIG. 7, an input signal transmitted through the apparatus 10 may be modulated and the output signal demodulated to provide additional signal integrity.

As mentioned, an outstanding advantage provided by the invention is the capability of electrically isolating an output signal from an input signal by utilizing an existing power transformer. Moreover, as has been shown, the invention provides for magnetically isolating the input and output signals from the input and output power that is transmitted by the transformer as well, so that the signals and the power can be transmitted without affecting each other. Further, the primary winding may be used to transmit one of the signal input or output currents with a secondary winding (which has not been shown) being used to transmit the other signal current, while the signal input and output windings can be used as primary and secondary power train windings without departing from the principles of the invention, such as shown and described in the present inventor's companion application entitled TRANSFORMER PROVIDING LOW OUTPUT VOLTAGE, executed on even date herewith and incorporated herein by reference in its entirety.

Although the preferred embodiment of the invention employs the core 13 for transmitting a signal through the input and output signal windings, these may be employed as another power train (primary and secondary) for transmitting power independently of the main power train as well. In this regard, it may be noted that the magnetic flux through the leg portions of the core 13 is the superposition of the magnetic flux due to the primary and that due to the input signal winding. However, the total magnetic flux resulting from this superposition at any instant leads to magnetic core loss and, therefore, increased heat dissipation in the transformer which is generally undesirable. Where the input signal winding transmits is used to transmit relatively low power compared to the primary winding, the additional core loss may be negligible. On the other hand, where it is desired to transmit appreciable power through the input signal winding, this additional loss may be unacceptable. Then, the frequency and phase of either or both the currents flowing through the primary and input signal windings may be adjusted to minimize this loss as will now be readily apparent to those having ordinary skill.

It is to be recognized that, while a particular method and apparatus for transmitting a signal through a power magnetic structure has been shown and described as preferred, other configurations and methods could be utilized, in addition to those already mentioned, without departing from the principles of the invention.

The terms and expressions which have been employed in the foregoing specification are used therein as terms of description and not of limitation, and there is no intention of the use of such terms and expressions of excluding equivalents of the features shown and described or portions thereof, it being recognized that the scope of the invention is defined and limited only by the claims which follow.

What is claimed is:

1. A device for transmitting a signal through a power magnetic structure having at least two apertures defining a center portion therebetween and two leg portions, comprising:

a first input winding looped around the center portion;

a second input winding having a first portion looped around one of the leg portions in one of the right or left hand sense, and a second portion of said second input winding looped around the other leg portion in the opposite sense; and a first output winding having a first portion looped around one of the leg portions in one of the right or left hand sense, and a second portion of said output winding looped around the other leg portion in a sense opposite to that of said first portion of said output winding.

2. The device of claim 1, further comprising a signal modulator coupled to said second input winding and a signal demodulator coupled to said first output winding.

3. The device of claim 1, further comprising a second output winding looped around one or more of the center portion and the leg portions.

4. A method for transmitting a signal through a power magnetic structure having at least two apertures defining a center portion therebetween and two leg portions, comprising:

providing a first input winding looped around the center portion;

providing a second input winding having a first portion looped around one of the leg portions in one of the right or left hand sense, and a second portion of said second winding looped around the other leg portion in the opposite sense;

providing a first output winding having a first portion looped around one of the leg portions in one of the right or left hand sense, and a second portion of said first output winding looped around the other leg portion in a sense opposite to that of said first portion of said first output winding;

conducting a first input current at a first power through said first input winding; and conducting a second input current at a second power through said second input winding and thereby inducing a first output current at substantially said second power through said first output winding.

5. The method of claim 4, wherein said first power and said second power are substantially different.

6. The method of claim 5, further comprising providing a second output winding looped around one or more of the center portion and the leg portions, wherein said step of conducting said first input current includes thereby inducing a second output current at substantially said first power through said second output winding, and using said second output current to power an active electrical device and using said first output current to control said active device.

* * * * *